(12) United States Patent
Washio

(10) Patent No.: US 7,883,567 B2
(45) Date of Patent: Feb. 8, 2011

(54) DEAERATING AND DISSOLVING APPARATUS, AND DEAERATING AND DISSOLVING METHOD

(75) Inventor: Seiichi Washio, Okayama (JP)

(73) Assignee: National University Corporation Okayama University, Okayama-shi (JP)

( * ) Notice: Subject to any disclaimer, the term of this patent is extended or adjusted under 35 U.S.C. 154(b) by 141 days.

(21) Appl. No.: 12/223,862

(22) PCT Filed: Feb. 15, 2007

(86) PCT No.: PCT/JP2007/052782

§ 371 (c)(1),
(2), (4) Date: Aug. 12, 2008

(87) PCT Pub. No.: WO2007/094434

PCT Pub. Date: Aug. 23, 2007

(65) Prior Publication Data

US 2009/0308253 A1    Dec. 17, 2009

(30) Foreign Application Priority Data

Feb. 15, 2006  (JP)  ............................. 2006 038465
Oct. 31, 2006  (JP)  ............................. 2006 296719

(51) Int. Cl.
*B01D 19/00* (2006.01)
*C02F 1/20* (2006.01)

(52) U.S. Cl. .................. 95/1; 95/262; 95/266; 96/156; 96/197

(58) Field of Classification Search .................. 95/260, 95/262, 266, 1; 96/194, 197, 156; 261/76, 261/DIG. 75
See application file for complete search history.

(56) References Cited

U.S. PATENT DOCUMENTS 2,632,597 A * 3/1953 Clark .......................... 417/196

(Continued)

FOREIGN PATENT DOCUMENTS

JP    A-03-118803    5/1991

(Continued)

OTHER PUBLICATIONS

Washio et al; Observation of Cavitation Inception in Hydraulic Oil Flow; Japan Society of Mechanical Engineers Collected Papers; Japan Society of Mechanical Engineers, Inc., May 1999.

(Continued)

*Primary Examiner*—Duane Smith
*Assistant Examiner*—Douglas J Theisen
(74) *Attorney, Agent, or Firm*—Oliff & Berridge, PLC

(57) ABSTRACT

The deaerating and dissolving apparatus or the deaerating and dissolving method includes: a pipe which is configured to feed a liquid; a flow rate control section which is provided to a middle portion of the pipe and is configured to feed the liquid at a predetermined flow rate to a downstream side; a cavity forming section which is provided to a middle portion of the pipe downstream of the flow rate control section and is configured to produce a stationary cavity which is in contact with the liquid, and a pressurization or depressurization section which pressurizes or depressurizes the inside of the cavity, wherein the liquid is deaerated when the inside of the cavity is depressurized with the pressurization or depressurization section, and a gas is dissolved into the liquid when the inside of the cavity is pressurized with the gas supplied through the pressurization or depressurization section.

8 Claims, 11 Drawing Sheets

U.S. PATENT DOCUMENTS

| | | | | |
|---|---|---|---|---|
| 3,398,507 | A | * | 8/1968 | Erhard et al. .................. 95/266 |
| 4,210,534 | A | * | 7/1980 | Molvar ....................... 210/220 |
| 2004/0251566 | A1 | * | 12/2004 | Kozyuk ....................... 261/76 |
| 2005/0109211 | A1 | * | 5/2005 | Shiraishi et al. ............... 95/241 |
| 2006/0027100 | A1 | * | 2/2006 | Kozyuk ....................... 95/260 |

FOREIGN PATENT DOCUMENTS

| | | |
|---|---|---|
| JP | A-07-132201 | 5/1995 |
| WO | WO 2004/071635 A1 | 8/2004 |

OTHER PUBLICATIONS

Kamiyama et al; Effect of degassing of Hydraulic Oil Cavitation Suppression; Japan Society of Mechanical Engineers Chugoku Shikoku Shibu Sokai Koenkai Koen Ronbunshu No. 055-1, 2005, p. 301-302.

* cited by examiner

DEAERATING AND DISSOLVING APPARATUS, AND DEAERATING AND DISSOLVING METHOD

TECHNICAL FIELD

The present invention relates to a deaerating and dissolving apparatus, a deaerating and dissolving method used in a process of deaerating a liquid, and a process of dissolving a gas in a liquid.

BACKGROUND ART

Conventionally, in feeding a liquid through a pipe having a narrow flow of area such as a pipe used in a hydraulic circuit or the like, when solubility of a gas dissolved in the liquid is high, there may be a case that air bubbles are generated in the liquid owing to a change of pressure applied to the liquid. These air bubbles are liable to easily obstruct the smooth flow of the liquid, may cause vibrations and noises or may give rise to a problem on smooth feeding of liquid or damages on the liquid by heat. Accordingly, in the hydraulic circuit or the like, an air bubble removal apparatus which removes air bubbles generated in the pipe is provided separately, or a liquid whose gas solubility is reduced by carrying out a deaerating process in advance is used.

On the other hand, in the food industry, as represented by recently popular "oxygen water", in order to increase functionality of a liquid, a gas such as oxygen is dissolved in a liquid at concentration higher than normal concentration.

These kinds of deaerating process and gas dissolving process are, in general, conducted such that a liquid to be processed is contained in a container vessel capable of containing the liquid in an airtight manner. In the case of the deaerating process, the inside of the container vessel is depressurized down to a predetermined degree of vacuum or below, while in the case of the dissolving process, a gas to be dissolved in the liquid to be processed is filled in the inside of the container vessel under pressure to bring the inside of the container vessel into a predetermined pressurized state and this pressurized state is left for a predetermined time.

In particular, in the case of the dissolving process, by carrying out bubbling of the liquid to be processed with the gas to be dissolved, it is also possible to make the dissolving process require a shorter process time. Also, in the case of carrying out the dissolving process, it is desirable that the process of deaerating the liquid is carried out in advance so as to remove an unnecessary gas and, at the same time, to make it easier for a necessary gas to dissolve. The process of dissolving a predetermined gas in the liquid to be processed may also be called a gas impregnating process.

In the case of the deaerating process, in place of the above-mentioned batch type process, there has been proposed an apparatus which includes a vacuum tank depressurized in advance at a high degree of vacuum and a pipe which feeds the liquid to the vacuum tank and carries out a deaerating process by continuously feeding a liquid to be processed into the vacuum tank (for example, see Patent Document 1).

Also, as another apparatus for deaerating process, there has been proposed an apparatus which carries out a deaerating process in such a manner that microscopic air bubbles are produced in a liquid to be processed by generating cavitation in the liquid and the microscopic air bubbles are removed (for example, see Patent Document 2).

In such a circumstance, in the course of study on a cavitation phenomenon in a liquid, the inventor of the present invention have found that when supercavitation which is one form of the cavitation phenomenon occurs, a cavity is stably formed in the pipe through which the liquid is being fed (for example, see Non-patent Document 1).

Moreover, the inventor has found that the pressure inside the cavity formed inside the pipe by supercavitation is stably maintained at a very low pressure level close to the vapor pressure of the liquid, and thereby a gas dissolved in the liquid which is in contact with the cavity is separated into the cavity, that is, the liquid is deaerated by the cavity formed inside the pipe.

Furthermore, the inventor has connected the cavity maintained at a pressure considerably lower than an atmospheric pressure with the atmosphere, and has found a phenomenon that an internal pressure of the cavity rises to the atmospheric pressure while maintaining a stable shape without disappearing, air sucked into the cavity is mixed with the liquid and is formed into microscopic air bubbles, and these microscopic air bubbles are expelled in large quantities from a downstream end of the cavity. The inventor also has found a phenomenon that air is quickly dissolved into the liquid through this process of generation of microscopic air bubbles.

Patent Document 1: JP-A-07-132201
Patent Document 2: JP-A-03-118803
Non-patent document 1: Seiichi Washio, other 3, "Observation of Cavitation Inception in Hydraulic Oil Flow", Japan Society of Mechanical Engineers collected papers, Japan Society of Mechanical Engineers, Inc., May, 1999, Volume 65, Number 633, Edition B, Pages 139 to 147

DISCLOSURE OF THE INVENTION

Problems the Invention is to Solve

In the deaerating process or the gas dissolving process depending on a batch process which uses a container vessel containing the liquid, there has been a problem that the efficiency of the process is low due to the limitation on the volume of liquid which can be subject to deaeration or dissolution for every butch process.

Also, in the case of feeding the liquid into the vacuum tank which is maintained in a high vacuum in advance and carrying out the deaerating process thereafter, there has been a drawback that the structure for stably maintaining the inside of the vacuum tank at the high degree of vacuum is liable to be complicated thus giving rise to a drawback that the apparatus becomes relatively large and a manufacturing cost is pushed up.

Furthermore, in the case of the deaeration process of producing microscopic air bubbles by cavitation and removing the microscopic air bubbles, the deaeration process not only requires a special air bubble removing apparatus utilizing a swirling flow or the like but also has a drawback that the liquid surrounding microscopic air bubbles is also removed together with microscopic air bubbles if it is attempted to completely remove the microscopic air bubbles leading to the large reduction of the liquid.

In view of such circumstances, the inventor comes up with an idea that, by utilizing a cavity generated by supercavitation, depressurization or pressurization of the inside of the cavity becomes possible because the cavity maintains a stable shape and is stationary. The inventor also comes up with an idea that due to such depressurization or pressurization of the inside of the cavity, it is possible to provide an apparatus which can carry out the deaeration of a liquid or the dissolution of a gas in the liquid at a high speed and at a relatively low cost. The present invention is made based on such ideas.

Means for Solving the Problems

A deaerating and dissolving apparatus of the present invention includes: a pipe which is configured to feed a liquid; a flow rate control section which is provided to a middle portion of the pipe and is configured to feed the liquid at a predetermined flow rate to a downstream side; a cavity forming section which is provided to a middle portion of the pipe downstream of the flow rate control section and is configured to produce a stationary cavity which is in contact with the liquid, and a pressurization/depressurization section which pressurizes or depressurizes the inside of the cavity, wherein the liquid is deaerated when the inside of the cavity is depressurized with the pressurization/depressurization section, and a gas is dissolved into the liquid when the inside of the cavity is pressurized with the gas supplied through the pressurization/depressurization section.

Furthermore, the deaerating and dissolving apparatus of the present invention is also characterized by the following points. That is, (1) a first flow passage which narrows a sectional area for flow thereof by a constricting body which is arranged in the flow passage and reduces a sectional area for flow of the liquid, a second flow passage which has a sectional area for flow larger than the sectional area for flow of the first flow passage, and a third flow passage which has a sectional area for flow smaller than the sectional area for flow of the second flow passage and larger than the sectional area for flow of the first flow passage are formed in the inside of the cavity forming section in order from an upstream side of the cavity forming section thus allowing the generation of a cavity in the second flow passage along with feeding of the liquid, and a through hole which is communicatively connected with the cavity is formed in the cavity forming section so as to pressurize or depressurize the inside of the cavity via the through hole.

(2) The pressurization/depressurization section includes a depressurization means which is configured to depressurize the inside of the cavity.

(3) The pressurization/depressurization section includes a pressurization means which is configured to feed the gas to be dissolved in the liquid to the cavity at a predetermined pressure.

(4) The pipe has both ends thereof connected to a tank which stores the liquid therein thus forming a circulatory circuit, while the pressurization means is communicatively connected with a hollow space defined in the tank and is also communicatively connected with the cavity thus filling the hollow space defined in the tank with the gas fed by the pressurization means.

(5) The pressurization/depressurization section includes a switching valve which changes over a communicable connection state between a state in which the pressurization means is communicatively connected with the cavity and a state in which the depressurization means is communicatively connected with the cavity.

(6) The point of separation for generating supercavitation in the fluid is formed on the constricting body.

Also, a deaerating and dissolving method includes the steps of: forming the point of separation in the inside of a pipe, generating supercavitation by the point of separation in a fluid being fed to and allowed to flow in the inside of the pipe thus forming a stationary cavity, forming a through hole which communicates with the cavity in the pipe, deaerating the liquid by depressurizing the inside of the cavity via the through hole, and dissolving a gas into the liquid by feeding the gas into the cavity so as to pressurize the gas inside the cavity.

Advantage of the Invention

According to the invention, the deaerating and dissolving apparatus includes the pipe which is configured to feed a liquid; the flow rate control section which is provided to the middle portion of the pipe and is configured to feed the liquid at a predetermined flow rate to the downstream side; the cavity forming section which is provided to the middle portion of the pipe downstream of the flow rate control section and is configured to produce the stationary cavity which is in contact with the liquid, and the pressurization/depressurization section which pressurizes or depressurizes the inside of the cavity, and such an apparatus carries out the deaeration of the liquid or the dissolution of the gas in the liquid by pressurizing or depressurizing the inside of the cavity with the pressurization/depressurization section. Accordingly, the present invention can carry out the sufficient deaeration of the liquid or the dissolution of the gas in the liquid as continuous processes using an extremely inexpensive apparatus.

DESCRIPTION OF REFERENCE NUMERALS AND SIGNS

Figure 1:
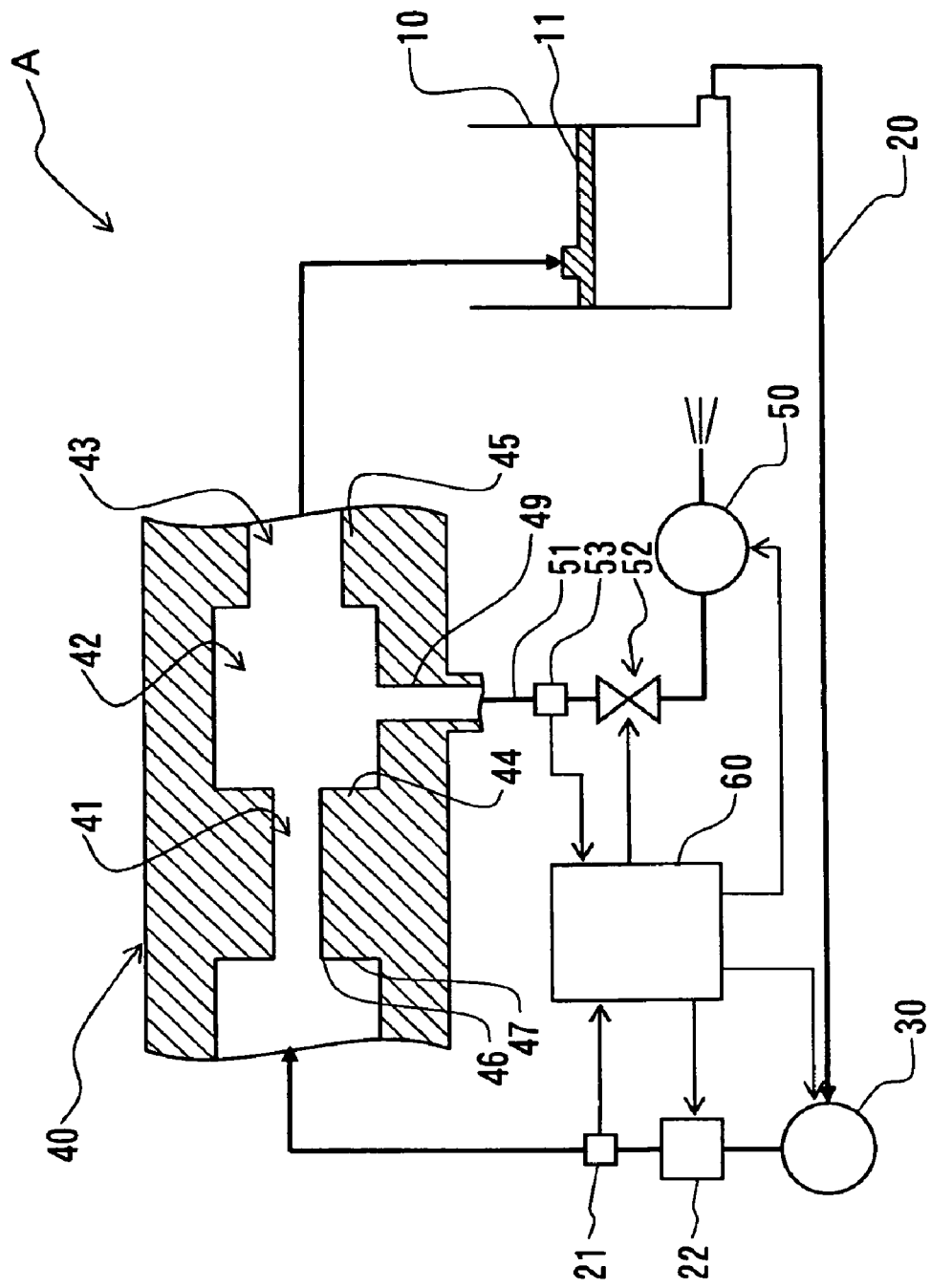
[FIG. 1] An outline schematic diagram of a deaerating and dissolving apparatus (a deaerating apparatus) according to an embodiment of the invention.

| | |
|---|---|
| A | Deaerating apparatus |
| 10 | Tank |
| 11 | Cover |
| 20 | Pipe |
| 21 | Flow rate sensor |
| 22 | Flow rate control valve |
| 30 | Pump |
| 40 | Gas separation pipe |

-continued

| 41 | First flow passage |
| 42 | Second flow passage |
| 43 | Third flow passage |
| 44 | First constricting body |
| 45 | Second constricting body |
| 46 | Point of separation |
| 47 | End face |
| 48 | Cavity |
| 49 | Through hole |
| 50 | Vacuum pump |
| 51 | Suction pipe |
| 52 | Open/close valve |
| 53 | Pressure gauge |
| 60 | Controller |

Best Mode for Carrying Out the Invention

In a deaerating and dissolving apparatus and deaerating and dissolving method of the invention, by generating supercavitation which is a form of cavitation to occur inside a pipe through which a liquid to be processed is fed, a stationary cavity is produced in a predetermined position inside the pipe and, by decreasing a pressure inside the cavity to almost a vacuum, it is possible to separate a gas dissolved in the liquid into the cavity thus reducing the solubility of the gas, or to the contrary, by raising the pressure inside the cavity to a predetermined level, it is possible to dissolve a gas into the liquid to its equilibrium point at this pressure thus increasing the solubility of the gas.

In this manner, utilizing a cavity in contact with a fluid, by carrying out the separation of the gas from the liquid, or the dissolution of the gas into the liquid, it is possible to regulate the gas solubility in the liquid extremely easily.

In particular, the deaerating and dissolving apparatus includes the pipe which feeds the liquid, a flow rate control section which is provided to a middle portion of the pipe and feeds the liquid to a downstream side at a predetermined flow rate, a cavity forming section which is installed downstream of the flow rate control section in a middle portion of the pipe and forms the stationary cavity in contact with the liquid, and a pressurization/depressurization section which regulates the pressure inside the cavity.

In the cavity forming section, a first flow passage which narrows a sectional area for flow thereof by a constricting body which is arranged in the flow passage and reduces a sectional area for flow of the liquid, a second flow passage which has a sectional area for flow larger than the sectional area for flow of the first flow passage, and a third flow passage which has a sectional area for flow smaller than the sectional area for flow of the second flow passage and larger than the sectional area for flow of the first flow passage are formed in the inside of the cavity forming section in order from an upstream side of the cavity forming section thus allowing the generation of a cavity in the second flow passage along with feeding of the liquid.

In this manner, by generating a cavity in the second flow passage portion, the area over which the liquid is in contact with the cavity can be made larger. Accordingly, not only the separation of the gas from the liquid but also the dissolution of the gas into the liquid can be executed more effectively.

Also, in the cavity forming section, a through hole communicating with the cavity is provided and, by communicatively connecting the pressurization/depressurization section to the cavity via the through hole, it is possible to easily regulate the pressure inside the cavity.

With respect to the cavity forming section, when simply providing the first flow passage, the second flow passage and the third flow passage, as previously described, velocity of the liquid for causing supercavitation in the cavity forming section becomes extremely high, which means that a large amount of energy is necessary, but by providing the source of the cavitation inception, which is a so-called "point of separation", on the constricting body arranged in the cavity forming portion, it is possible to generate a cavity by causing the supercavitation even in a condition in which velocity of the liquid is relatively low.

When a gas is separated from a liquid using the deaerating and dissolving apparatus of the present invention, that is, when the deaerating and dissolving apparatus of the invention is used as the deaerating apparatus, it is desirable that the vapor pressure of the liquid to be deaerated is a liquid with as low as possible. When a liquid with a high vapor pressure is a liquid to be deaerated, there exists a possibility that that the liquid is vaporized when the liquid comes into contact with the cavity generated by supercavitation thus causing a mass reduction of the liquid. However, in an operation mode in which there is no problem even though the liquid mass is reduced, or when some mechanism to collect the liquid vapor is provided, it is also possible to use the deaerating and dissolving apparatus of the present invention as the deaerating apparatus for a liquid with a high vapor pressure.

On the other hand, when the gas is dissolved into the liquid using the deaerating and dissolving apparatus of the invention, that is, when the deaerating and dissolving apparatus of the present invention is used as the dissolving apparatus, the dissolution of the gas is easily accomplished by pressurizing the inside of the cavity to a pressure higher than the liquid vapor pressure with the pressurization/depressurization section, on top of which, the gas solubility is easily controlled by controlling the pressure inside the cavity. In particular, by making the tank, which stores the liquid in which the gas is dissolved by the cavity forming section and the pressurization/depressurization section, airtight, it is possible not only to keep other gases from being in contact with the dissolving gas but also to improve the efficiency of gas dissolution by setting the pressure of the inside of the tank higher than the atmospheric pressure.

Hereafter, the way of using the deaerating and dissolving apparatus of the invention as the deaerating apparatus is explained first, and the way of using it as the dissolving apparatus is explained next. Hereafter, the deaerating and dissolving apparatus of the invention will be simply called the deaerating apparatus when it is used for deaeration, and will be called the dissolving apparatus when used for dissolution of gas. The dissolving apparatus may also be called a gas impregnating apparatus.

As shown in FIG. 1, the deaerating apparatus A of the present invention is composed of a tank 10, which stores a liquid to be processed, a pipe 20 constituting a circulatory circuit with its both ends connected to the tank 10, a pump 30 installed in a middle portion of the pipe 20, which sucks the liquid in the tank 10 and discharges it to a downstream side, a cavity forming pipe 40 installed in a middle portion of the pipe 20, which is a section to form a cavity in contact with the liquid, in such a way as is described below, and a vacuum pump 50, which is a depressurization means to reduce the pressure inside the cavity formed in the cavity forming pipe 40.

Furthermore, the deaerating apparatus A includes a controller 60 which controls the drive of the pump 30 and the vacuum pump 50, and the drive control of the pump 30 is executed by the controller 60 so that a predetermined flow rate of the liquid is supplied to the pipe 20, and thereby a cavity is formed inside the cavity forming pipe 40.

A floating lid 11 is arranged in the tank 10, so as to restrain the gas from dissolving into the liquid when the liquid returns to the tank 10 via the pipe 20 after being deaerated in the cavity forming pipe 40.

The pump 30, which is controlled by the controller and feeds the liquid to the downstream side at a predetermined flow rate, in particular, is expected to have a function of varying its outflow continuously as will be described later.

In a middle portion of the pipe 20, a flow rate sensor 21, which detects the flow rate of the liquid in the pipe 20, and a flow rate control valve 22, which adjusts the flow rate of the liquid in the pipe 20, are incorporated. The flow rate sensor 21 inputs a flow rate detection signal into the controller 60, while the controller 60 controls the flow rate control valve 22 and the pump 30, based on the signal input from the flow rate sensor 21, so as to set the flow rate of the liquid inside the pipe 20 to a predetermined flow rate. The flow rate sensor 21 and the flow rate control valve 22, being arranged on an upstream side of the cavity forming pipe 40, enable the generation of a stable cavity in the cavity forming pipe 40 by allowing the liquid to be fed to the cavity forming pipe 40 at a predetermined flow rate.

The adjustment of the flow rate is not necessarily performed by the flow rate control valve 22 and the pump 30 alone, but may be performed by providing a relief valve. In this embodiment, the flow rate control section is formed of the flow rate sensor 21, the flow rate control valve 22, the pump 30, and the controller 60.

Apart from the flow rate control valve 22, it is also possible to incorporate appropriately an accumulator to absorb pulsation, a cooler to control the liquid temperature, a filter, a relief valve and the like in the pipe 20 to maintain a stable flow rate of the liquid at a predetermined flow rate. Furthermore, a temperature sensor, which detects a temperature of the liquid, can be provided in the pipe 20 together with the flow rate sensor 21 and, when a viscosity of the liquid changes substantially depending on the temperature of the liquid, the flow rate control valve 22 and the pump 30 are controlled by the controller 60.

In the cavity forming section 40, as shown in FIG. 1, a first flow passage 41 having a sectional area for flow smaller than a sectional area for flow of the pipe 20 by setting a first constricting body 44 of a cylindrical restrictor having an inward protuberant wall, a second flow passage 42 having a sectional area for flow larger than the sectional area for flow of the first flow passage 41, and a third flow passage 43 having a sectional area for flow smaller than the sectional area for flow of the second flow passage 42 but larger than the sectional area for flow of the first flow passage 41 are arranged in this order from the upstream side.

In this embodiment, the second flow passage 42 is made to have the same flow passage diameter as the flow passage diameter of the pipe 20. Also, by setting a second constricting body 45 of a cylindrical restrictor having an inward protuberant wall in the third flow passage 43 portion, a flow passage diameter of the third flow passage 43 portion is reduced.

The first flow passage 41, the second flow passage 42, and the third flow passage 43 are all arranged parallel to the longitudinal direction of the cavity forming pipe 40. Lengths of the first flow passage 41, the second flow passage 42, and the third flow passage 43 can be appropriately selected according to the viscosity and velocity of a liquid to be deaerated.

The point of separation 46 for causing cavitation at an upstream distal edge of the first flow passage 41 is provided on the first constricting body 44.

In this embodiment, the point of separation 46 is constituted by the cavity forming pipe 40 and the upstream end face 47 of a first protuberant body 44 perpendicularly intersecting with the longitudinal direction of the cavity forming pipe 40, as a rectangular corner portion formed by the end face 47 and an inner peripheral surface of the first flow passage 41.

Figure 2:
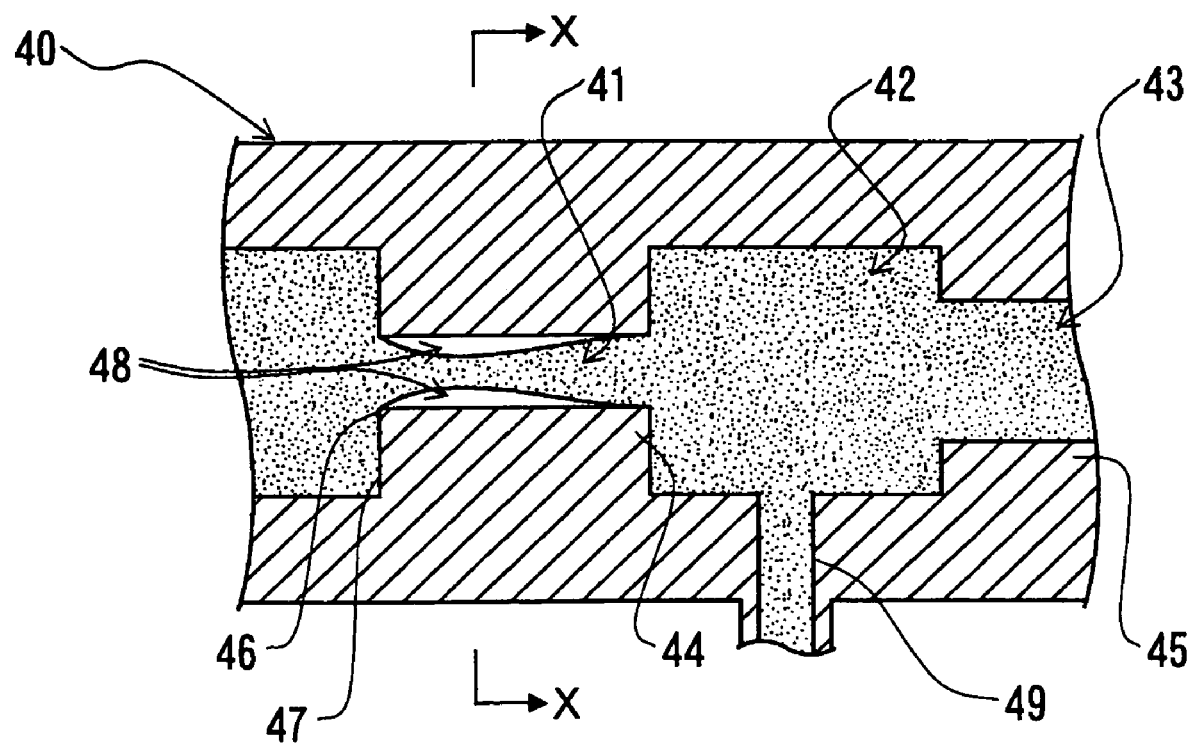
[FIG. 2] An illustration of a condition in which a cavity is formed in a cavity forming pipe.
Figure 3:
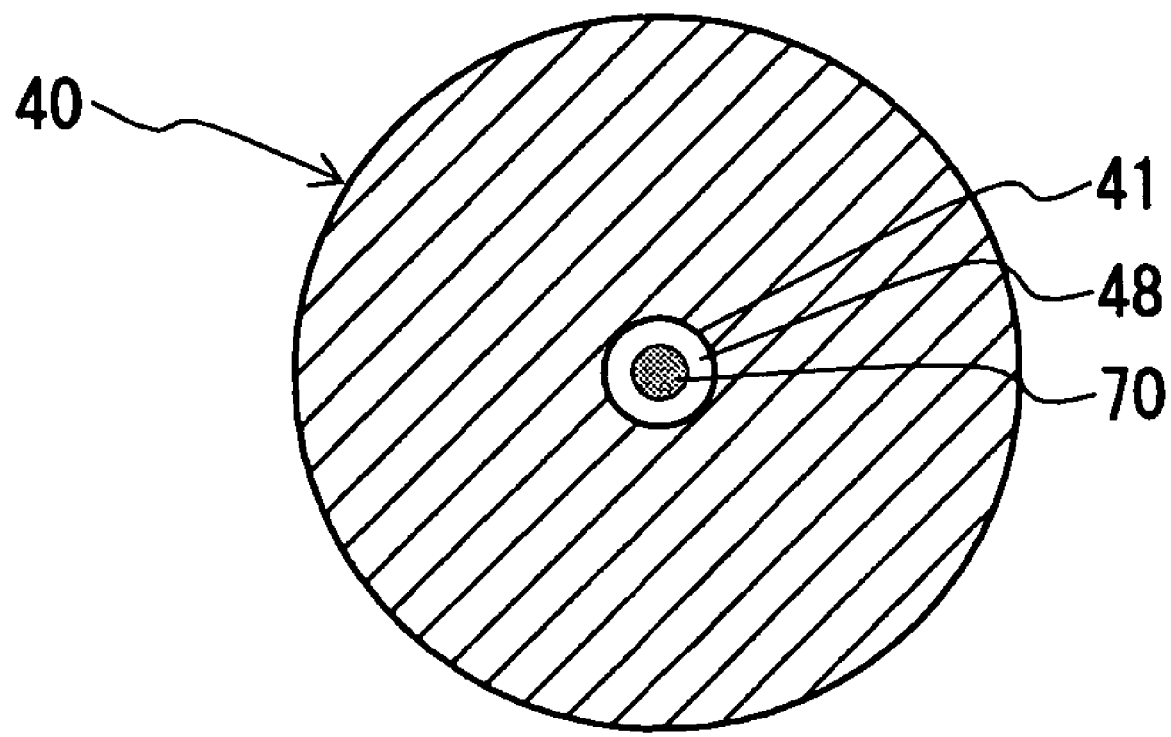
[FIG. 3] An X-X sectional view of FIG. 2.

In this manner, by constituting the point of separation 46 as a rectangular corner portion, the liquid fed into the first flow passage 41 is more likely to be separated from the inner peripheral surface of the first flow passage 41 and consequently, it becomes possible to generate a cavity 48 by supercavitation, as shown in FIG. 2, on a downstream side of the point of separation 46 even at relatively low liquid velocity. As demonstrated in FIG. 3 which is a cross-sectional view taken along a line X-X in FIG. 2, the cavity 48 is formed along the inner peripheral surface of the first flow passage 41, and a liquid 70 passes through the central part of the first flow passage 41.

Since the downstream side of the point of separation 46 constitutes the first flow passage 41 having an inner diameter smaller than an inner diameter of the pipe 20, it is possible to increase the velocity of the liquid passing through the first flow passage 41 and to reduce a dynamic pressure of the fluid and hence, it is possible to sufficiently develop the cavitation starting at the point of separation 46 to supercavitation, resulting in the generation of the cavity 48 downstream of the point of separation 46.

The shape of the point of separation 46 is not limited to the rectangular corner, and it is also possible to form the point of separation 46, for example, of a projection with an acute angle or, as long as it is possible to cause the cavity 48 by supercavitation, of a projection with an obtuse angle.

Figure 4:
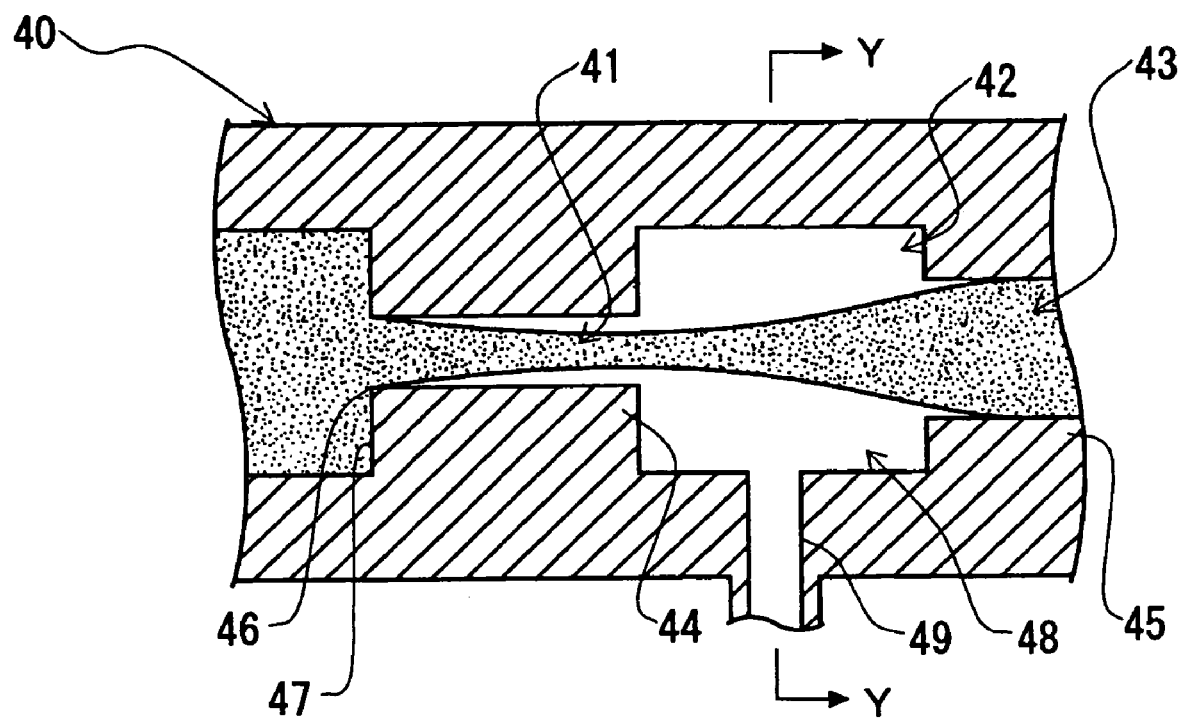
[FIG. 4] An illustration of a condition in which a cavity is formed in the cavity forming pipe.
Figure 5:
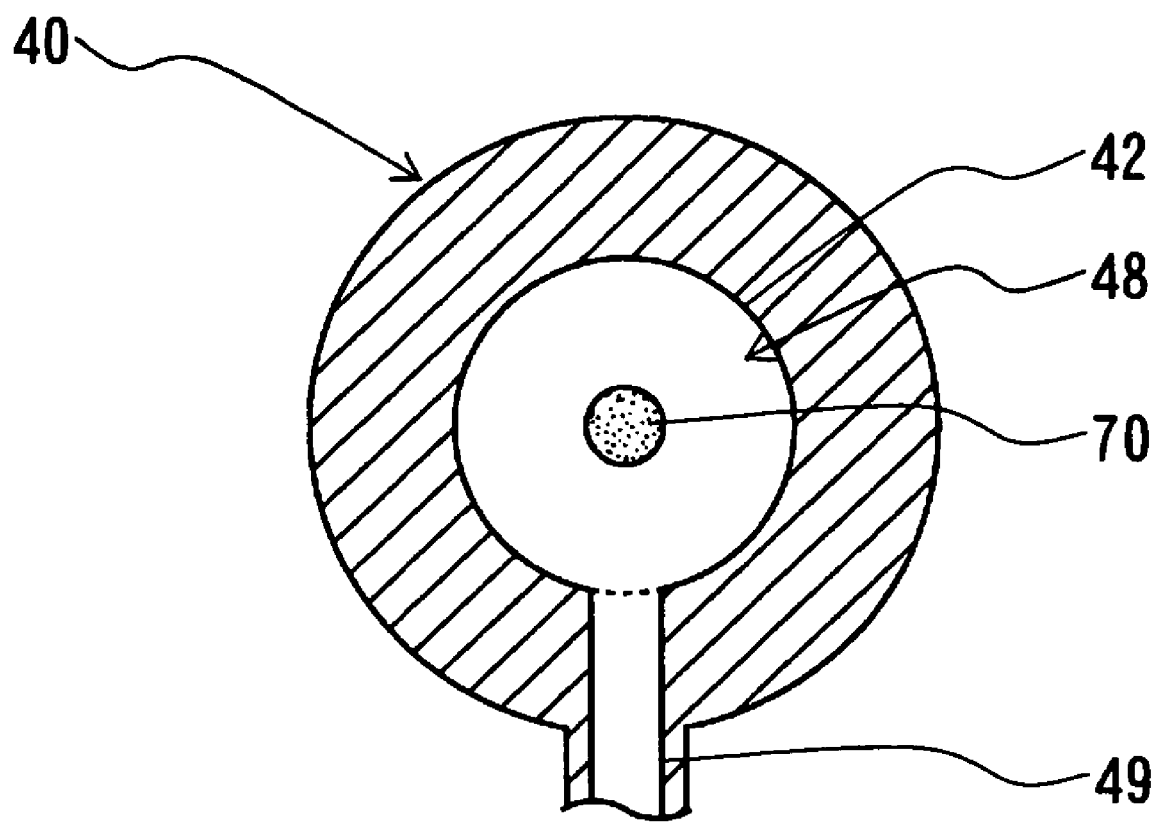
[FIG. 5] A Y-Y sectional view of FIG. 4.

After the cavity 48 is generated in the first flow passage 41 as shown in FIG. 2, by further increasing the flow rate of the liquid by means of the pump 30 or the flow rate control valve 22, it is possible to extend the cavity 48 as far as the second flow passage 42, as shown in FIG. 4. In FIG. 5, it being a Y-Y sectional view of FIG. 4, the cavity 48 is formed along the inner peripheral surface of the second flow passage 42, and the liquid 70 passes through a central part of the second flow passage 42.

A through hole 49 communicatively connected to the second flow passage 42 is provided for the second flow passage 42 portion of the cavity forming pipe 40, and air inside the cavity 48 formed in the second flow passage 42 can be sucked, via the through hole 49 with the vacuum pump 50.

That is, by connecting one end of a suction pipe 51 to the through hole 49 portion of the cavity forming pipe 40 and by connecting the other end of the suction pipe 51 to the vacuum pump 50, the cavity forming pipe 40 and the vacuum pump 50 are communicatively connected via the suction pipe 51.

In FIG. 1, component 52 indicates an open/close valve interposed in the suction pipe 51 and prevents the liquid from flowing from the suction pipe 51 into the vacuum pump 50 until the cavity 48 is generated by supercavitation in the second flow passage 42. The ON-OFF action of the open/close valve 52 is controlled by the controller 60 and, after the feeding flow rate of the liquid has become large enough for the cavity 48 to be formed in the second flow passage 42 by supercavitation, the vacuum pump 50 starts to run, and the open/close valve 52 changes over a state thereof from a valve-closed state to a valve opened state.

Figure 6:
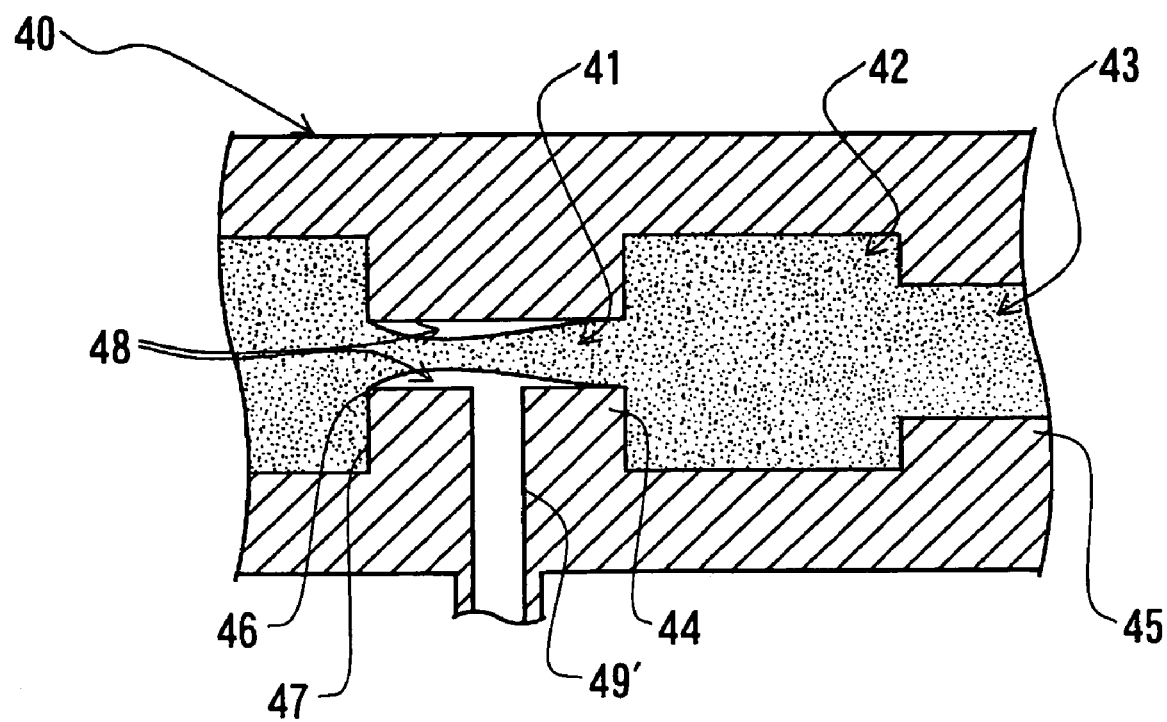
[FIG. 6] An illustration of another embodiment of the cavity forming pipe.

The location of the through hole 49 in the cavity forming pipe 40 can be flexibly chosen as long as the cavity 48 generated by supercavitation and the through hole 49 are communicated with each other, and it is possible, for example, to provide a through hole 49' communicatively connected with the first flow passage 41, as shown in FIG. 6. However, when the through hole 49' is communicatively connected with the first flow passage 41, a distance between a first flow passage 41 side end of the through hole 49' and the liquid surface inside the first flow passage 41 is so small that there is a possibility that the fluid is sucked into the through hole 49'. Accordingly, it is desirable to provide the through hole 49 in the second flow passage 42 portion so as to keep the distance from the end portion of the through hole 49 to the liquid as long as possible.

Also, it is possible to increase a contact area of the cavity 48 and the liquid by developing the cavity 48 as large as possible, the efficiency of separating the gas from the liquid can be improved.

In the suction pipe 51, a pressure gauge 53 is mounted between the through hole 49 and the open/close valve 52, and by detecting a drop of pressure inside the through hole 49 using the pressure gauge 53, it is possible to detect an instantaneous moment at which the cavity 48 is formed in the second flow passage 42 portion.

In the deaerating apparatus A having the above-mentioned constitution, when the liquid with a flow rate equal to or larger than the predetermined flow rate is discharged into the pipe 20 on the upstream side of the cavity forming pipe 40, as shown in FIG. 2, the cavity 48 is firstly formed in the first flow passage 41. Subsequently, by further increasing the velocity of the liquid, the cavity 48 expands, and the cavity 48 is generated in the second flow passage 42 as shown in FIG. 4.

Before the cavity 48 is generated in the second flow passage 42, as an intermediate condition, the inside of the second flow passage 42 is filled with bubbles, and it is possible to generate the cavity 48 in the second flow passage 42 by increasing the velocity of the liquid in the pipe 20 until the bubbles disappear. In the condition in which the cavity 48 is generated in the second flow passage 42, the velocity of the liquid in the pipe 20 is maintained constant.

As shown in FIG. 4, the liquid which passes through the second flow passage 42 is fed, while dispersing in a funnel shape, toward the downstream side and, by making the sectional area for flow of the third flow passage 43 smaller than the sectional area for flow of the second flow passage 42, but larger than the sectional area for flow of the first flow passage 41, it is possible to make it easy to cause the dispersed liquid to follow the third flow passage 43 and hence, it is possible to smoothly feed the liquid to the downstream side, and to make it easy to generate the cavity 48 which has become a space closed inside the second flow passage 42.

Rather than making the third flow passage 43 as a flow passage extending, maintaining a fixed sectional area for flow, in the longitudinal direction of the cavity forming pipe 40, in this embodiment, as the sectional area for flow of the third flow passage 43 is made smaller than the sectional area for flow of the second flow passage 42 having the same flow passage diameter as the flow passage diameter of the pipe 20, it is also possible to form the third flow passage 43 in a tapered shape, opened toward the downstream side, causing an inner peripheral surface of the third flow passage 43 to connect smoothly with the inner peripheral surface of the pipe 20.

In the deaerating apparatus A of this embodiment, the tank 10 is provided downstream of the cavity forming pipe 40, and the tank 10 functions as a low dynamic pressure section which releases the dynamic pressure acting on the liquid and hence, it is possible to smoothly feed and circulate the liquid downstream of the cavity forming pipe 40 thus making it easy to generate the cavity 48 in the first flow passage 41 and the second flow passage 42.

The low dynamic pressure section is not limited to the constitution which completely releases the dynamic pressure acting on the liquid as in the case of the tank 10, it is also possible to simply provide, downstream of the cavity forming pipe 40, a pipe with a sectional area of flow which makes the dynamic pressure considerably lower than the dynamic pressure acting on the liquid in the cavity forming pipe 40.

By generating the cavity 48 in the cavity forming pipe 40 in this manner, the inside of the cavity 48 is brought into an extremely low pressure state (around a few hectopascals) determined by a vapor pressure of the liquid and an amount of dissolved gas, and the liquid which intrudes into the open/close valve 52 via the through hole 49 is sucked out due to an extremely low pressure action of the cavity 48.

Furthermore, with respect to the liquid which is in contact with the cavity 48, due to the remarkable drop of pressure (vapor pressure) at an interface with the cavity 48, the separation of the gas dissolved in the liquid occurs along with the evaporation of the liquid occurs, and both of vapors of the liquid and a gas separated from the liquid exist in the cavity 48. When the vapor pressure of the liquid is low, a vapor yield from the liquid is extremely small.

The gas separated into the cavity 48 and the vapor in the liquid are expelled to an exterior of the cavity forming pipe 40 by opening the open/close valve 52 and operating the vacuum pump 50. With the gradual removal of the gas separated into the cavity 48, it is possible to prevent the redissolution of the gas separated into the cavity 48 in the liquid thus realizing the deaeration.

In this manner, in the deaerating apparatus A, by separating the gas dissolved in the liquid utilizing the cavity 48 generated by supercavitation in the cavity forming pipe 40, and by gradually expelling the separated gas using the vacuum pump 50, it is possible to carry out the continuous deaeration.

Figure 7:
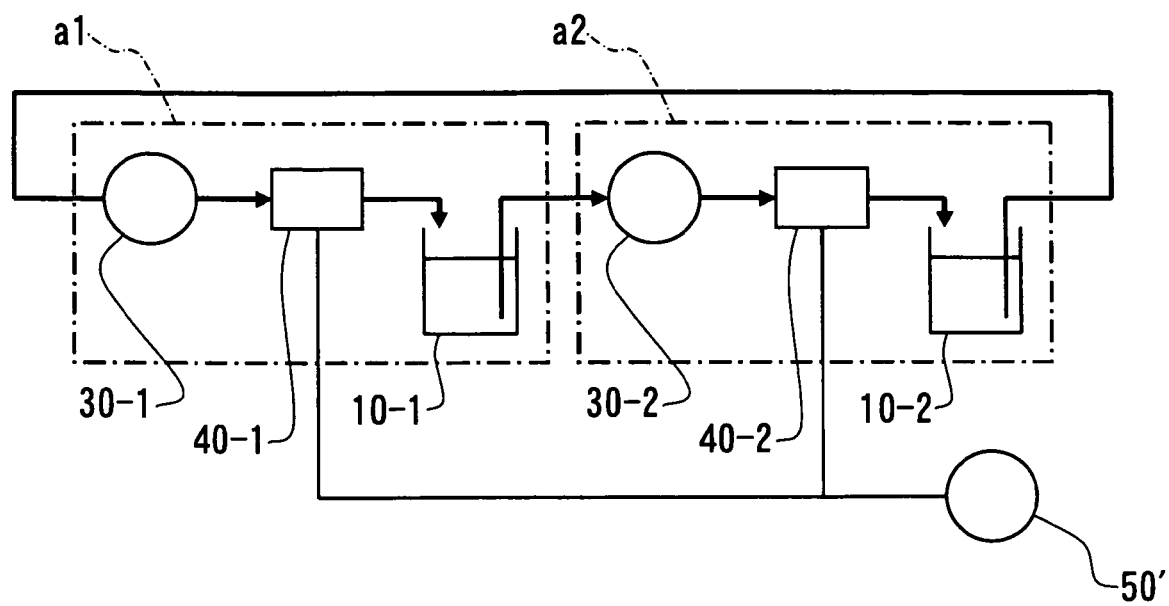
[FIG. 7] An outline schematic diagram of a deaerating apparatus of another embodiment.

In the deaerating apparatus A of this embodiment, a circulatory circuit which allows the circulation of the liquid is constituted of the pipe 20 and the deaeration is carried out by one cavity forming pipe 40 disposed in the pipe 20. However, as schematically shown in FIG. 7, by constituting a first deaerating section a1 using a first pump 30-1 which enables the adjustment of the feeding volume of the liquid, a first cavity forming pipe 40-1 and a first tank 10-1, by constituting a second deaerating section a2 using a second pump 30-2 which enables the adjustment of the feeding volume of the liquid, a second cavity forming pipe 40-2 and a second tank 10-2, and by connecting the first deaerating section a1 and the second deaerating section a2 in series, it is possible to increase deaerating process capability per hour by continuously carrying out the deaeration in the first deaerating section a1 and the second deaerating section a2.

Here, the first deaerating section a1 and the second deaerating section a2 use a vacuum pump 50' which is connected to the first cavity forming pipe 40-1 and the second cavity forming pipe 40-2 in common and hence, an equipment cost can be reduced.

When it is necessary to further increase the deaerating process capability per unit hour, it is possible to increase the process capability by, in place of adopting the two-stage serial connection of the first deaerating section a1 and the second deaerating section a2, adopting a multi-stage serial connection of deaerating sections.

Further, by connecting deaerating sections each of which is constituted of at least a pump, a cavity forming pipe and a low dynamic pressure section such as a tank in series in multiple stages, it is also possible to carry out the separation of liquids which differ in vapor pressure from each other. To be more specific, this constitution can be used in a process of removing water from oil into which water is mixed or the like.

In circulating a liquid with a high vapor pressure using the deaerating apparatus A of the invention, a gas expelled from the vacuum pump 50 may be formed into a gas obtained by evaporating the liquid thus utilizing the deaerating apparatus A as an evaporator.

Figure 8:
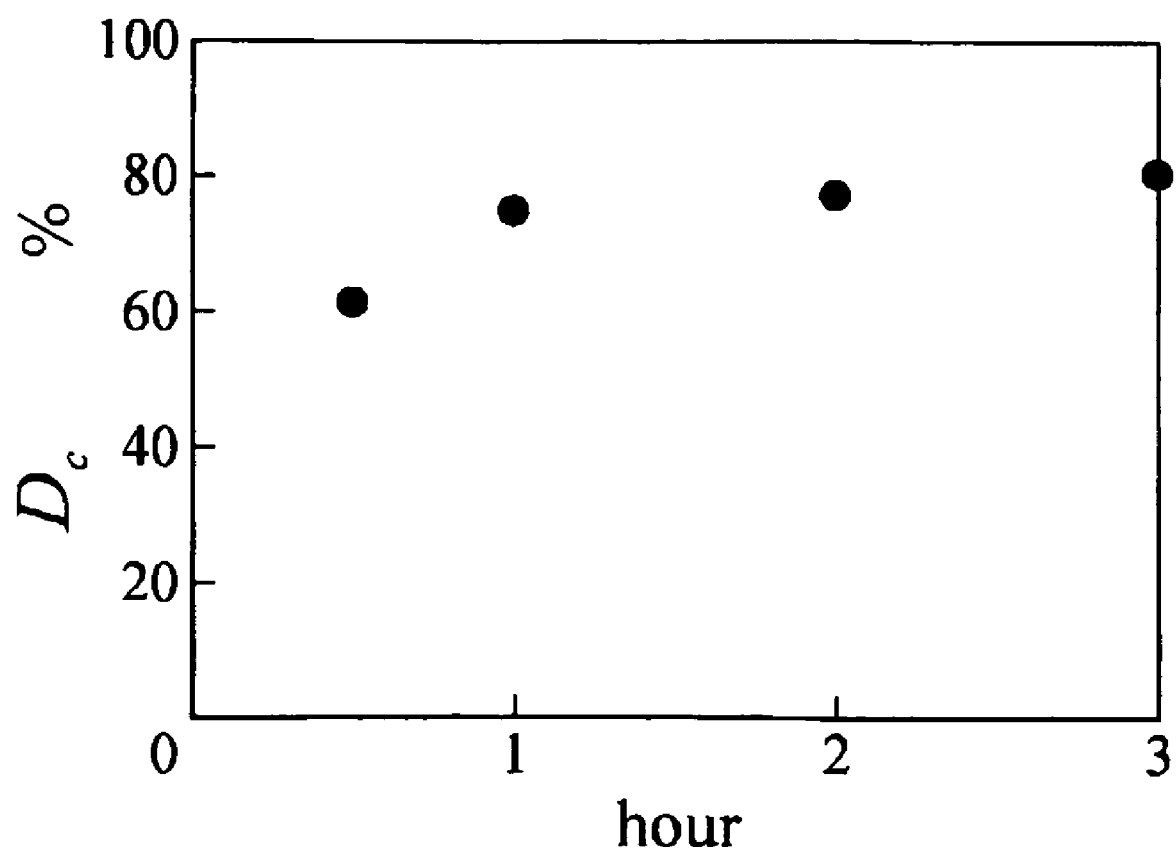
[FIG. 8] A deaeration transition graph showing a change in degree of deaeration of oil in the deaerating apparatus shown in FIG. 1.

As a specific example, a change in degree of deaeration when oil is used as the liquid a total amount of 25 liters of oil is treated using the deaerating apparatus A shown in FIG. 1 is shown in FIG. 8.

Here, in the cavity forming apparatus 40, a first flow passage 41 having an inner diameter of 2 mm and a length of 25 mm, a second flow passage 42 having an inner diameter of 18.5 mm and a length of 147 mm, and a third flow passage 43 having an inner diameter of 9.5 mm and a length of 26 mm are provided. In such constitution, the first flow passage 41 is formed by a first constricting body 44 which constitutes a cylindrical restrictor, and the third flow passage 43 is formed by a third constricting body 43.

The inner diameter of the pipe 20 is set to 18.5 mm, an upstream pressure which is a pressure upstream of the cavity forming pipe 40 is set to 7 MPa, a delivery pressure of the third flow passage 43 downstream of the cavity forming pipe 40 is set to the atmospheric pressure, and a flow rate of the oil is set to approximately 250 cc per second. A temperature of the oil is maintained at 25 degrees Celsius by an oil cooler disposed in the pipe 20. When oil is used as the liquid, a vapor pressure of oil is extremely low and hence, there is almost no possibility that oil is vaporized in the cavity 48.

As shown in FIG. 8, the deaeration proceeds to approximately 60% in 30 minutes. Thereafter, the deaeration progresses along with a lapse of time, and when three hours elapses, the degree of deaeration becomes 80%.

Figures 9A, 9B:
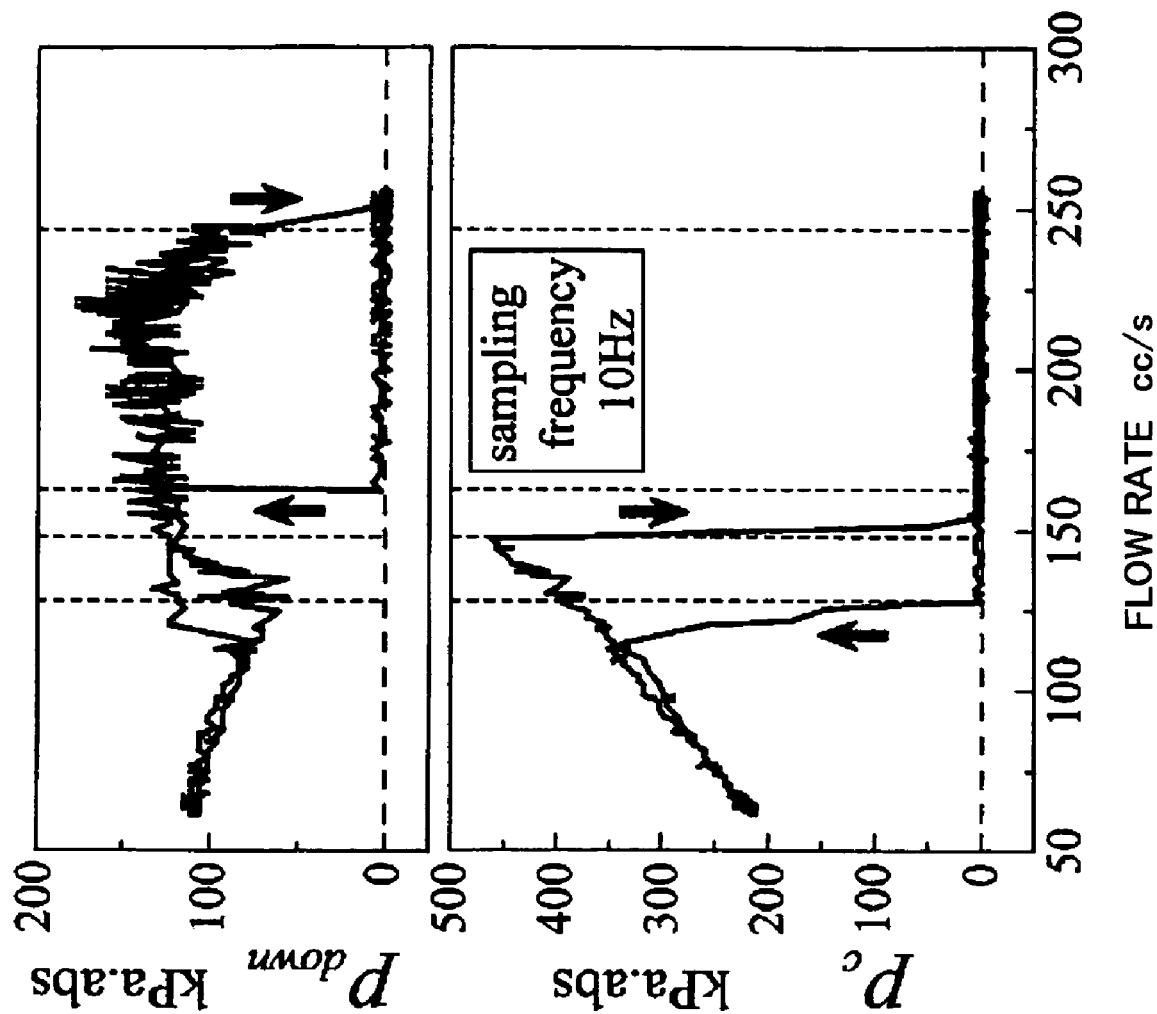
[FIG. 9] A is a graph showing the relationship between the flow rate of a liquid flowing through the cavity forming pipe and the pressure in the second flow passage, and B is a graph showing the relationship between the flow rate of the liquid flowing through the cavity forming pipe and the pressure in the first flow passage.

As shown in FIG. 9A which is a graph describing the correlation between a pressure in the second flow passage 42 and a flow rate of the liquid and FIG. 9B which is a graph describing the correlation between a pressure in the first flow passage 41 and a flow rate of the liquid, according to this embodiment, when the flow rate of the liquid is increased, the cavity 48 is formed in the first flow passage 41, as shown in FIG. 2, at a flow rate which reaches a first threshold value of approximately 150 cc per second. When the flow rate of the liquid is further increased such that the flow rate reaches a second threshold value of approximately 245 cc per second, it is possible to form the cavity 48 in a state that the cavity 48 expanded to the inside of the second flow passage 42 as shown in FIG. 4.

In this manner, once the cavity 48 is formed, even when the flow rate of the liquid is reduced, it is possible to maintain the cavity 48 in the second flow passage 42. In this embodiment, when the flow rate is set to a value smaller than the third threshold value of approximately 160 cc per second, the cavity 48 in the second flow passage 42 disappears.

Furthermore, when the flow rate of the liquid is reduced to assume a value smaller than a fourth threshold value of approximately 125 cc per second, the cavity 48 in the first flow passage 41 also disappears.

In this manner, once the cavity 48 is formed, the cavity 48 remains in the second flow passage 42 even when the flow rate of the liquid is reduced. Accordingly, in the deaerating apparatus A, after forming the cavity 48 in the second flow passage 42 by setting the flow rate of the liquid to a value equal to or greater than the second threshold value, the flow rate of the liquid is reduced to a level which is not smaller than the third threshold value thus preventing the pump 30 from falling into a heavily loaded condition.

Consequently, with respect to a pump used in the deaerating apparatus A, it is unnecessary to always drive the pump at a high output but it is sufficient to momentarily drive the pump at a required high output. Accordingly, a pump of a relatively low price can be used thus reducing a manufacturing cost of the deaerating apparatus A.

Figure 10:
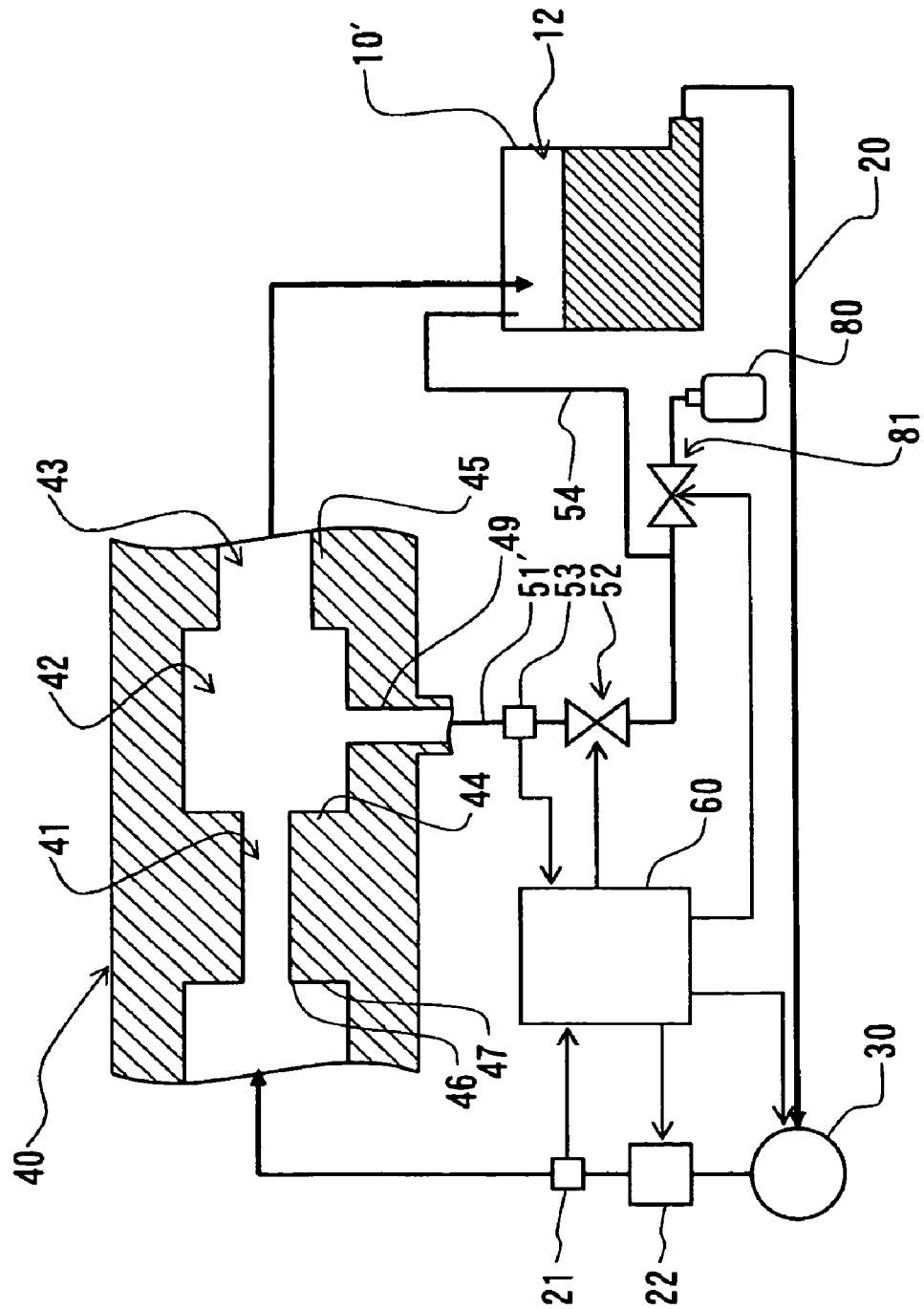
[FIG. 10] An outline schematic diagram of a deaerating and dissolving apparatus (a dissolving apparatus) according to an embodiment of the invention.
Figure 11:
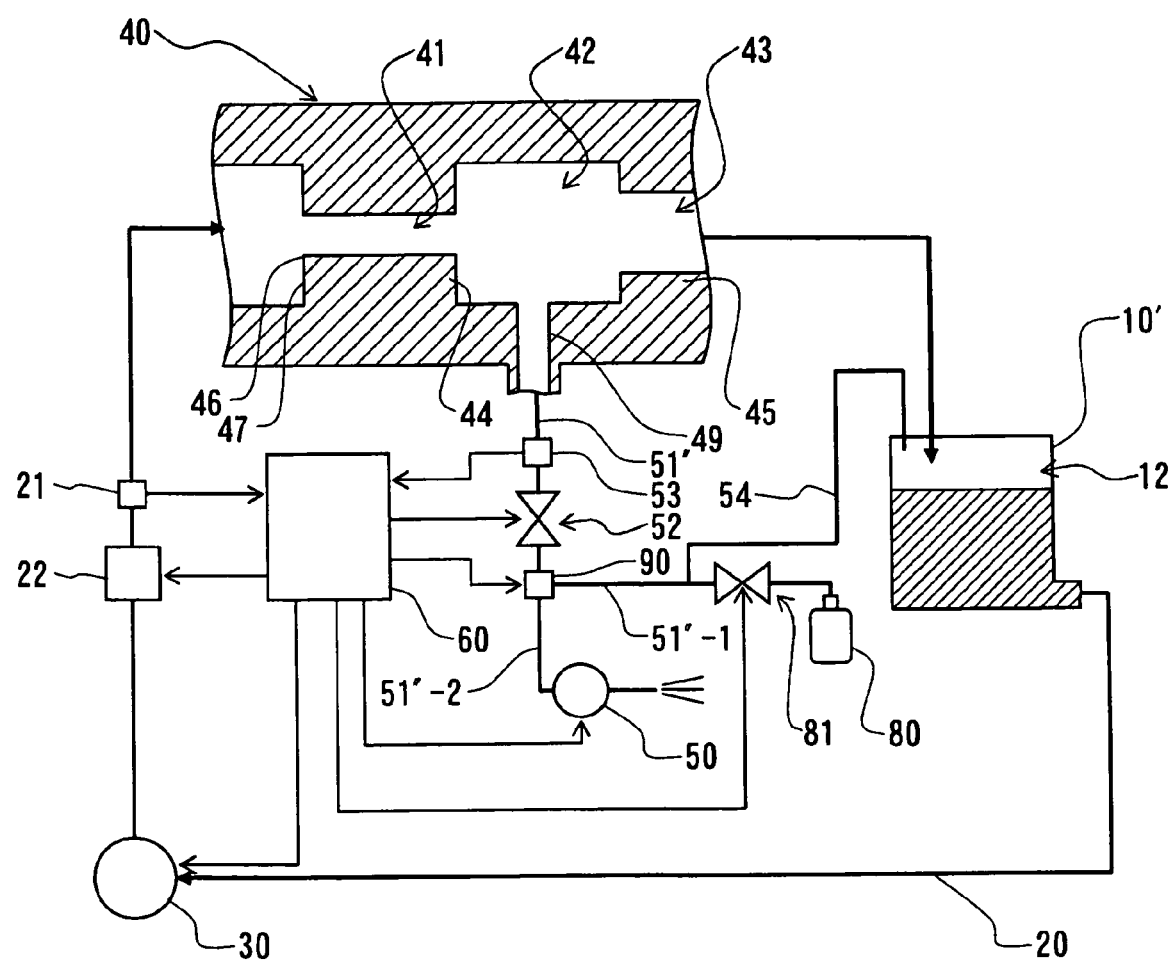
[FIG. 11] An outline schematic diagram of a deaerating and dissolving apparatus of another embodiment.

Next, the dissolving apparatus is explained the dissolving apparatus is, as shown in FIG. 10, configured such that a gas canister 80 is connected to a through hole 49 formed in the cavity forming pipe 40 as a pressurization means in place of the vacuum pump 50 via a depressurization valve 81. Constitutional parts of the dissolving apparatus identical to the corresponding constitutional parts of the previously described deaerating apparatus A are indicated by same symbols and an overlapping description will be omitted.

As shown in FIG. 10, the dissolving apparatus of the invention is constituted of a tank 10' which stocks a liquid to be processed, a pipe 20 which connect both ends thereof to the tank 10' thus forming-an circulatory circuit, a pump 30 which is arranged on a middle portion of the pipe 20, sucks liquid in the tank 10' and feeds liquid to a downstream side, a cavity forming pipe 40 which constitutes a cavity forming section formed in a middle portion of the pipe 20 and forming a cavity with which the liquid makes contact as described hereafter, and a gas canister 80, which seals a gas to be fed into the cavity formed in the cavity forming pipe 40.

The dissolving apparatus also includes a controller 60 which performs a drive control of the pump 30. By performing the drive control of the pump 30 using the controller 60, the liquid is fed to the pipe 20 at a predetermined flow rate and a cavity is formed in the inside of the cavity forming pipe 40.

A flow rate sensor 21 for detecting the flow rate of the liquid in the pipe 20, and a flow rate control valve 22 which adjusts the flow rate of the liquid in the pipe 20 are provided to a middle portion of the pipe 20.

In the cavity forming section 40, a first flow passage 41 having a sectional area for flow smaller than a sectional area for flow of the pipe 20, a second flow passage 42 having a sectional area for flow larger than the sectional area for flow of the first flow passage 41, and a third flow passage 43 having a sectional area for flow smaller than the sectional area for flow of the second flow passage 42, but larger than the sectional area for flow of the first flow passage 41 are formed in this order from an upstream side of the cavity forming section 40. Here, the first flow passage 41 is formed by a first constricting body 44 which is constituted of a cylindrical restrictor having an inward protuberant wall, and the point of separation 46 for generating cavitation at an upstream distal edge of the first flow passage 41 is formed on the first constricting body 44.

Furthermore, the through hole 49 which is communicatively connected to the second flow passage 42 is provided to a portion of the second flow passage 42 of the cavity forming pipe 40 and hence, it is possible to introduce the gas supplied from the gas canister 80 into the cavity 48 via the through hole 49.

That is, one end of a gas pipe 51' is connected to the through hole 49 portion of the cavity forming pipe 40 and, at the same time, the other end of the gas pipe 51' is connected to the gas canister 80 thus allowing the cavity forming pipe 40 and the gas canister 80 communicatively connected with each other via the gas pipe 51'.

In particular, the depressurization valve 81 is provided to the gas pipe 51' for adjusting a pressure of the gas fed from the gas canister 80 to a predetermined pressure. In this embodiment, a pressurization/depressurization section is formed of the depressurization valve 81 and the gas canister 80 which constitutes a pressurization means, and the depressurization valve 81 may be controlled by the controller 60 so as to properly adjust the pressure of the gas to be fed into the cavity 48. The pressurization means is not limited to the depressurization valve 81 and the gas canister 80. That is, an appropriate gas generator may be used as the pressurization means, and a pump such as a simple diaphragm pump may be also used as the pressurization means, for example, provided that the pump can dissolve air in the liquid.

The open/close valve 52 is provided to the gas pipe 51' for preventing the liquid from flowing into the depressurization valve 81 from the gas pipe 51' until the cavity 48 is generated due to the supercavitation in the second flow passage 42. The open/close valve 52 is subject to an ON-OFF control by the controller 60. After the feeding of the liquid at the velocity at which the cavity 48 is generated in the second flow passage 42 due to the supercavitation, the open/close valve 52 changes over a valve state from a closed state to an open state.

The through hole 49 may be arranged at any position in the cavity forming pipe 40 provided that the cavity 48 which is generated by supercavitation and the through hole 49 are communicated with each other. For example, as shown in FIG. 6, the through hole 49' may be communicatively connected with the first flow passage 41. Further, by generating the cavity 48 as large as possible, a contact area between the cavity 48 and the liquid can be increased thus enhancing efficiency of dissolving a gas in the liquid.

The pressure gauge 53 is mounted on the gas pipe 51' between the through hole 49 and the open/close valve 52. The pressure gauge 53 detects the reduction in pressure inside the through hole 49 thus detecting an instantaneous moment that the cavity 48 is formed in the portion of the second flow passage 42.

In the dissolving apparatus having such constitution, when the liquid is supplied to a portion of the pipe 20 upstream side of the cavity forming pipe 40 at a predetermined flow rate or more by driving the pump 30, as shown in FIG. 2, firstly, the cavity 48 is generated in the first flow passage 41 and, thereafter, the cavity is expanded along with the increase of the velocity of the liquid thus generating the cavity 48 in the second flow passage 42 as shown in FIG. 4.

When the cavity 48 is formed in the cavity forming pipe 40 in this manner, the inside of the cavity 48 is brought into an extremely low pressure (around a few hectopascals) state which is determined based a vapor pressure of the liquid and an amount of dissolved gas. By feeding a gas from the gas canister 80 to the cavity 48 at a pressure higher than the pressure inside the cavity 48 in such a condition, it is possible to cause the gas supplied from the gas canister 80 to dissolve in the liquid.

A liquid containing microscopic bubbles is generated along with the supply of the gas from the gas canister 80 in the cavity forming pipe 40, and the liquid is fed to the downstream side. The gas inside these gas bubbles is the gas supplied from the gas canister 80 and is formed into microscopic air bubbles. The microscopic air bubbles can remarkably increase a contact area between the liquid and the gas increasing and hence, it is possible to increase the efficiency of dissolving the gas in the liquid.

Furthermore, the deaerating device of this embodiment maybe configured such that the tank 10' is formed of a hermetic tank provided with a relief valve not shown in the drawing, and an end of a branch pipe 54 branched from the gas pipe 51' downstream of the depressurization valve 81 is connected with an hollow space 12 in the tank 10'. The gas is also fed to the tank 10' from the gas canister 80 so as to pressurize the inside of the tank 10' and, at the same time, to bring the inside of the tank 10' into an atmosphere caused by the gas fed from the gas canister 80 and hence, it is possible to increase the efficiency of dissolving the gas in the liquid. It is also possible to immerse the end of the branch pipe 54 connected to the tank 10' in the liquid in the tank 10' thus generating bubbling of the gas fed from the branch pipe 54 in the liquid.

By feeding the gas at a pressure equal to or greater than the atmospheric pressure using the depressurization valve 81 which can adjust the pressure of the gas fed from the gas canister 80, it is possible to increase the efficiency of dissolving of the gas in the liquid.

In applying the dissolving process of the necessary gas to the liquid, it is desirable that the liquid is deaerated in advance.

For this end, as another embodiment, as shown in FIG. 12, a switching valve 90 is provided to a connecting pipe 51", which has one end thereof connected to the through hole 49 portion of the cavity forming pipe 40, the connecting pipe 51" is branched to a first connecting pipe 51"-1 and a second connecting pipe 51"-2 by the switching valve 90, the gas canister 80 is communicably connected to the first connecting pipe 51"-1, and a vacuum pump 50 is communicatively connecting to the second connecting pipe 51"-2. Due to such constitution, firstly, the vacuum pump 50 is communicatively connected to the cavity 48 by the switching valve 90 so as to carry out the deaerating process of the liquid and thereafter, the gas canister 80 is communicatively connected to the cavity 48 via the depressurization valve 81 by changing over the switching valve 90 so as to carry out the dissolving process of the gas.

In this manner, by providing the depressurization means to the pressurization/depressurization section together with the pressurization means, it is possible to allow the apparatus to function as both the deaerating apparatus and the gas dissolving apparatus by the switching operation of the switching valve 90.

By using this kind of dissolving apparatus, with respect to water used in a food processing, by firstly carrying out the deaerating process thus removing oxygen dissolved in the water and, thereafter, by dissolving nitrogen in water by the gas dissolving process, it is possible to generate low oxygen water.

With the use of such low oxygen water produced in this manner, it is possible to prevent the occurrence of a deterioration of food due to the oxidization of the food caused by the oxygen dissolved in water thus effectively preventing the lowering of quality of a product handled in a state that the product is immersed in water such as pickles, tofu or the like. Further, it is possible to enhance the preservative quality of the product.

Nitrogen is dissolved in low oxygen water for enhancing the preservative quality.

INDUSTRIAL APPLICABILITY

With use of the deaerating and dissolving apparatus and deaerating and dissolving method of the invention, the deaerating process and the dissolving process can be performed as consecutive processes and hence, it is possible to enhance the operating efficiency. Particularly, when the apparatus is used as the deaerating apparatus, for example, the apparatus may be assembled in a hydraulic circuit so as to carry out the continuous deaeration of oil. On the other hand, when the apparatus is used as the dissolving apparatus, the apparatus may be provided to a middle portion of a liquid feed pipe so as to a desired gas in the liquid thus realizing the continuous supply of a liquid to which functionality is imparted.

The invention claimed is:

1. A deaerating and dissolving apparatus comprising:
   a pipe which is configured to feed a liquid;
   a flow rate control section which is provided to a middle portion of the pipe and is configured to feed the liquid at a predetermined flow rate to a downstream side;
   a cavity forming section which is provided to a middle portion of the pipe downstream of the flow rate control section and is configured to produce a stationary cavity which is in contact with the liquid; and
   a pressurization or depressurization section which pressurizes or depressurizes an inside of the cavity; wherein:
   the liquid is deaerated when the inside of the cavity is depressurized with the pressurization or depressurization section, and a gas is dissolved into the liquid when the inside of the cavity is pressurized with the gas supplied through the pressurization or depressurization section, a first flow passage which narrows a sectional area for flow thereof by a constricting body which is arranged in the flow passage and reduces a sectional area for flow of the liquid, a second flow passage which has a sectional area for flow larger than the sectional area for flow of the first flow passage, and a third flow passage which has a sectional area for flow smaller than the sectional area for flow of the second flow passage and larger than the sectional area for flow of the first flow passage are formed in the inside of the cavity forming section in order from an upstream side of the cavity forming section thus allowing the generation of a cavity in the second flow passage along with feeding of the liquid, a through hole which is communicatively connected with the cavity is formed in the cavity forming section so as to pressurize or depressurize the inside of the cavity via the through hole, the pressurization or depressurization section includes a depressurization means which is configured to depressurize the inside of the cavity, the pressurization or depressurization section includes a pressurization means which is configured to feed the gas to be dissolved in the liquid to the cavity at a predetermined pressure, and the pipe has both ends thereof connected to a tank which stores the liquid therein thus forming a circulatory circuit, while the pressurization means is communicatively connected with a hollow space defined in the tank and is also communicatively connected with the cavity thus filling the hollow space defined in the tank with the gas fed by the pressurization means.

2. The deaerating and dissolving apparatus according to claim 1, wherein a point of separation for generating supercavitation in the fluid is formed on the constricting body.

3. A deaerating and dissolving method using the apparatus according to claim 2, comprising steps of:
forming the point of separation in an inside of the pipe, generating supercavitation by the point of separation in a fluid being fed to and allowed to flow in the inside of the pipe thus forming a stationary cavity,
dearating the liquid by depressurizing the inside of the cavity via the through hole, and
dissolving a gas into the liquid by feeding the gas into the cavity so as to pressurize the gas inside the cavity.

4. A deaerating and dissolving method using the apparatus according to claim 1, comprising steps of:
forming a point of separation in an inside of the pipe, generating supercavitation by the point of separation in a fluid being fed to and allowed to flow in the inside of the pipe thus forming a stationary cavity,
dearating the liquid by depressurizing the inside of the cavity via the through hole, and
dissolving a gas into the liquid by feeding the gas into the cavity so as to pressurize the gas inside the cavity.

5. A deaerating and dissolving apparatus comprising:
a pipe which is configured to feed a liquid;
a flow rate control section which is provided to a middle portion of the pipe and is configured to feed the liquid at a predetermined flow rate to a downstream side;
a cavity forming section which is provided to a middle portion of the pipe downstream of the flow rate control section and is configured to produce a stationary cavity which is in contact with the liquid; and
a pressurization or depressurization section which pressurizes or depressurizes an inside of the cavity; wherein:
the liquid is deaerated when the inside of the cavity is depressurized with the pressurization or depressurization section, and a gas is dissolved into the liquid when the inside of the cavity is pressurized with the gas supplied through the pressurization or depressurization section, a first flow passage which narrows a sectional area for flow thereof by a constricting body which is arranged in the flow passage and reduces a sectional area for flow of the liquid, a second flow passage which has a sectional area for flow larger than the sectional area for flow of the first flow passage, and a third flow passage which has a sectional area for flow smaller than the sectional area for flow of the second flow passage and larger than the sectional area for flow of the first flow passage are formed in the inside of the cavity forming section in order from an upstream side of the cavity forming section thus allowing the generation of a cavity in the second flow passage along with feeding of the liquid, a through hole which is communicatively connected with the cavity is formed in the cavity forming section so as to pressurize or depressurize the inside of the cavity via the through hole, the pressurization or depressurization section includes a depressurization means which is configured to depressurize the inside of the cavity, the pressurization or depressurization section includes a pressurization means which is configured to feed the gas to be dissolved in the liquid to the cavity at a predetermined pressure, and the pressurization or depressurization section includes a depressurization means which depressurizes the inside of the cavity, and includes a switching valve which changes over a communicable connection state between a state in which the pressurization means is communicatively connected with the cavity and a state in which the depressurization means is communicatively connected with the cavity.

6. The deaerating and dissolving apparatus according to claim 5, wherein a point of separation for generating supercavitation in the fluid is formed on the constricting body.

7. A deaerating and dissolving method using the apparatus according to claim 6, comprising steps of:
forming the point of separation in an inside of the pipe, generating supercavitation by the point of separation in a fluid being fed to and allowed to flow in the inside of the pipe thus forming a stationary cavity,
dearating the liquid by depressurizing the inside of the cavity via the through hole, and
dissolving a gas into the liquid by feeding the gas into the cavity so as to pressurize the gas inside the cavity.

8. A deaerating and dissolving method using the apparatus according to claim 5, comprising steps of:
forming a point of separation in an inside of the pipe, generating supercavitation by the point of separation in a fluid being fed to and allowed to flow in the inside of the pipe thus forming a stationary cavity,
dearating the liquid by depressurizing the inside of the cavity via the through hole, and
dissolving a gas into the liquid by feeding the gas into the cavity so as to pressurize the gas inside the cavity.

* * * * *